US009646490B2

(12) United States Patent
Tosa (10) Patent No.: US 9,646,490 B2
(45) Date of Patent: May 9, 2017

(54) VEHICLE TRAVELING SUPPORT COMMUNICATION APPARATUS AND COMMUNICATION SYSTEM

(71) Applicant: Mitsubishi Electric Corporation, Tokyo (JP)

(72) Inventor: Takatoshi Tosa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 22 days.

(21) Appl. No.: 14/636,974

(22) Filed: Mar. 3, 2015

(65) Prior Publication Data

US 2016/0140843 A1 May 19, 2016

(30) Foreign Application Priority Data

Nov. 18, 2014 (JP) .................................. 2014-233377

(51) Int. Cl.
*G08G 1/123* (2006.01)
*G08G 1/005* (2006.01)
*G08G 1/16* (2006.01)
*H04W 4/04* (2009.01)

(52) U.S. Cl.
CPC ............. *G08G 1/005* (2013.01); *G08G 1/162* (2013.01); *H04W 4/046* (2013.01)

(58) Field of Classification Search
CPC .................................................... G08G 1/123
USPC .......................................................... 340/989
See application file for complete search history.

(56) References Cited

U.S. PATENT DOCUMENTS

| 8,723,691 | B2* | 5/2014 | Li | G08G 1/166 340/539.22 |
|---|---|---|---|---|
| 2007/0054685 | A1* | 3/2007 | Kellum | G01S 13/931 455/517 |
| 2009/0161644 | A1* | 6/2009 | Suzuki | H04W 72/10 370/341 |
| 2009/0187300 | A1* | 7/2009 | Everitt | G01C 21/3602 701/31.4 |
| 2011/0213520 | A1* | 9/2011 | Yaguchi | B60L 11/184 701/22 |
| 2012/0056734 | A1* | 3/2012 | Ikeda | G08G 1/165 340/425.5 |
| 2012/0206099 | A1* | 8/2012 | Ichikawa | B60L 11/1838 320/109 |
| 2012/0242468 | A1* | 9/2012 | Nakayama | G10K 15/02 340/425.5 |
| 2012/0316768 | A1* | 12/2012 | Haran | G08G 1/168 701/300 |

(Continued)

FOREIGN PATENT DOCUMENTS

JP  2005-009933 A  1/2005
JP  2009-282713 A  12/2009

*Primary Examiner* — Santiago Garcia
(74) *Attorney, Agent, or Firm* — Sughrue Mion, PLLC; Richard C. Turner (57) ABSTRACT

The start and end of the transmission of information is controlled by, depending on the situation, determining whether to stop transmitting position information on a vehicle-mounted terminal device transmitted by a vehicle-to-vehicle communication between a vehicle of interest and a surround vehicle and position information on a portable terminal device transmitted by a pedestrian-to-vehicle communication between the portable terminal device carried by a person who got off its own vehicle and a surround vehicle.

7 Claims, 5 Drawing Sheets

(56) References Cited

U.S. PATENT DOCUMENTS

| | | | | |
|---|---|---|---|---|
| 2013/0079953 A1* | 3/2013 | Kumabe | ................ | G05D 1/024 |
| | | | | 701/2 |
| 2014/0043152 A1* | 2/2014 | Lippman | ............... | B60W 30/14 |
| | | | | 340/438 |
| 2014/0062685 A1* | 3/2014 | Tamatsu | ................ | B60Q 5/005 |
| | | | | 340/425.5 |
| 2014/0200757 A1* | 7/2014 | Kojima | .................. | B60L 11/14 |
| | | | | 701/22 |
| 2015/0116121 A1* | 4/2015 | Hur | ....................... | G08B 21/24 |
| | | | | 340/686.6 |
| 2015/0207745 A1* | 7/2015 | Funabashi | ............... | H04L 47/27 |
| | | | | 370/235 |
| 2015/0251585 A1* | 9/2015 | Jeong | ...................... | B60Q 1/04 |
| | | | | 701/36 |
| 2015/0356797 A1* | 12/2015 | McBride | ............ | G07C 9/00119 |
| | | | | 340/5.61 |
| 2016/0019785 A1* | 1/2016 | Zhang | ................ | G01C 21/3423 |
| | | | | 340/905 |

* cited by examiner

VEHICLE TRAVELING SUPPORT COMMUNICATION APPARATUS AND COMMUNICATION SYSTEM

BACKGROUND OF THE INVENTION

Filed of the Invention

This invention relates to a communication apparatus and a communication system for supporting safe traveling of a vehicle, and more particularly, to a vehicle traveling support communication apparatus and communication system for detecting another vehicle and a pedestrian as an obstacle and providing information to a vehicle driver.

Description of the Related Art

Various proposals have been made as a traveling support system for enabling a vehicle such as an automobile to travel safely. For example, vehicles communicate information with one another using a communication apparatus mounted on each vehicle (hereafter, referred to as a vehicle-to-vehicle communication) to exchange their own position information, and, if a collision between the vehicles is predicted, to provide information to an occupant in advance, or support the traveling such as operating a braking device. Further, a support system is proposed by which, in addition to providing vehicle position information, in order to prevent another vehicle from colliding with the occupant who got off the vehicle, when the occupant gets off, information is provided to the other vehicle by regarding the occupant as an obstacle existing around the vehicle to avoid an accident that the other vehicle collides with the pedestrian (for example, Patent Document 1). What is proposed in Patent Document 1 is that a sensor mounted on the vehicle where the driver got off detects the driver immediately after getting off the vehicle as a moving object around the vehicle, and provides the position information on the detected object through a vehicle-to-vehicle communication, allowing a driver of a surrounding vehicle to grasp not only the vehicle of interest, but also the presence of an obstacle around the vehicle in advance.

Moreover, it is proposed that in addition to a vehicle-mounted terminal device, a pedestrian carries a portable terminal device for transmitting position information, such that information is communicated between the vehicle and the pedestrian (hereinafter referred to as a pedestrian-to-vehicle communication), so as to avoid a collision between the vehicle and the pedestrian, and further, when a pedestrian carrying a portable terminal device is riding in a vehicle, information is not provided because the collision with the pedestrian is incorrect (for example, Patent Document 2). What is proposed in the Patent Document 2 is that whether a person carrying a portable terminal device is riding in the vehicle or outside the vehicle is determined based on the relationship between the position information on the portable terminal device and the position information on the vehicle, and whether to provide information on a collision is determined.

[Patent Document 1] JP-A-2009-282713
[Patent Document 2] JP-A-2005-009933

As described above, as a communication device and communication system for supporting safe traveling of a vehicle, much information is transmitted to provide a variety of information. However, as in Patent Document 1, in a situation where a vehicle-mounted sensor functions to transmit information on an obstacle therearound, for example, after a driver gets off the vehicle, even when the driver moves outside the detection area of the vehicle-mounted sensor, or even when an environmental condition gets worse while the driver is leaving the vehicle and the detection performance of the sensor is reduced, the communication should be continued in order to provide information. In addition, because, in a parking area and the like, many objects to be detected exist therearound and the sensor tries to transmit their position information, the transmission capacity is constrained, and in some cases, the sensor falls into a communication disabled state.

Moreover, as in Patent Document 2, in a situation where the position information on the driver after getting off the vehicle is provided by using the portable terminal device, when the driver is within the vehicle, information from the portable terminal device is restricted, but when the driver leaves the vehicle, the stopping vehicle and the portable terminal device continue to transmit information. Therefore, both of the side which receives information and the side which transmits information handle a lot of information, thus, problems such as the delay of response, communication disability, and the occurrence of abnormal operation may arise.

The present invention was made in order to solve these problems, and it is an object of the present invention to provide a smooth vehicle traveling support communication system by limiting the provision of information by determining, depending on the situation, whether to stop transmitting each position information transmitted by a vehicle-to-vehicle communication between a vehicle of interest and a surrounding vehicle and each position information transmitted by a pedestrian-to-vehicle communication between a portable terminal device carried by a pedestrian and a surrounding vehicle.

SUMMARY OF THE INVENTION

In order to achieve this purpose, a vehicle traveling support communication apparatus of the present invention includes a communication unit for performing a vehicle-to-vehicle communication between a vehicle-mounted terminal device for an own vehicle and a vehicle-mounted terminal device for a surrounding vehicle, and a pedestrian-to-vehicle communication between the vehicle-mounted terminal device for the own vehicle and a portable terminal device, a position estimation unit for obtaining position information on the vehicle-mounted terminal device for the own vehicle, a getting on/off detection unit for detecting that a person who has been riding in the vehicle gets off it, and a control unit for causing the communication unit to transmit position information on the vehicle-mounted terminal device for the own vehicle obtained by the position estimation unit to the surrounding vehicle when the getting on/off detection unit detects the person who got off the vehicle, and to terminate the transmission of the position information on the vehicle-mounted terminal device for the own vehicle by the communication unit, upon receiving mobile position information from the portable terminal device carried by the person who got off the vehicle through the pedestrian-to-vehicle communication of the communication unit.

Further, in the vehicle traveling support communication apparatus of the present invention, the position estimation unit has a function of obtaining position information on the portable terminal device in addition to position information on the vehicle-mounted terminal device for the own vehicle, and the control unit controls to terminate the transmission of the position information on the vehicle-mounted terminal device for the own vehicle when a distance between the vehicle-mounted terminal device and the portable terminal device becomes more than or equal to a predetermined distance.

Furthermore, in the vehicle traveling support communication apparatus of the present invention, when the getting on/off detection unit detects that the person who got off the vehicle gets on the vehicle again within a predetermined time, the transmission of the position information on the vehicle-mounted terminal device for the own vehicle through the vehicle-to-vehicle communication is terminated.

Moreover, in a vehicle traveling support communication system of the present invention, control is exercised by previously registering the portable terminal device in association with the communication apparatus so as to identify that information is from the registered portable terminal device.

In addition, in the traveling support communication system of the present invention, the transmission of the mobile position information is started from the portable terminal device when the portable terminal device is at a predetermined distance or more from the vehicle-mounted terminal device.

According to the vehicle traveling support communication system of the present invention, the start and end of the transmission of information by the vehicle-mounted terminal device and the portable terminal device is controlled depending on the situation of the portable terminal device with respect to the vehicle-mounted terminal device, thereby, it is possible to realize a traveling support communication system in which the amount of transmitted information is not constrained.

In addition, when the person gets off the vehicle, the getting-off position is transmitted to a surrounding vehicle, thereby, the position just after the person got off can be grasped quickly, and when mobile position information is delivered by the portable terminal device carried by the person, the transmission of the mobile position information is terminated, thereby, it is possible to prevent communication information from being constrained by unnecessary data.

Further, when the person who got off the vehicle leaves the getting-off position, the transmission of the position information on the vehicle-mounted terminal device is terminated so as to terminate the transmission of the position information at an appropriate time when the getting-off position information becomes unnecessary, thereby, it is possible to prevent communication information from being constrained by unnecessary data.

Furthermore, in an environment where there are a plurality of communication devices and a plurality of portable terminal devices, it is possible to ensure that communication is not terminated accidentally even when position information is received from a portable terminal device which is not related to the own vehicle, for example.

Moreover, when the person gets on the vehicle again without leaving the vehicle after getting off it, the transmission of unnecessary mobile position information is terminated, thereby, it is possible to prevent communication information from being constrained by unnecessary data.

Further, the portable terminal device can refer to highly accurate position information just after the person got off the vehicle; for example, the portable terminal device can smoothly and accurately use a terminal position display and navigation service immediately after the person got off the vehicle. In addition, the portable terminal device also transmits the own terminal position information so that the position of a pedestrian can be confirmed in real time, and, when the distance from the vehicle-mounted terminal device is equal to or less than a predetermined distance, no mobile position information is transmitted, thereby, it is possible to reduce power consumption required by a pedestrian-to-vehicle communication.

Further, the position information on the portable terminal device is received through a pedestrian-to-vehicle communication, such that a surrounding vehicle can determine whether the person who got off the vehicle leaves the vehicle, thereby, it is possible to stop the transmission of unnecessary position information by considering that there is no pedestrian around the communication apparatus.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
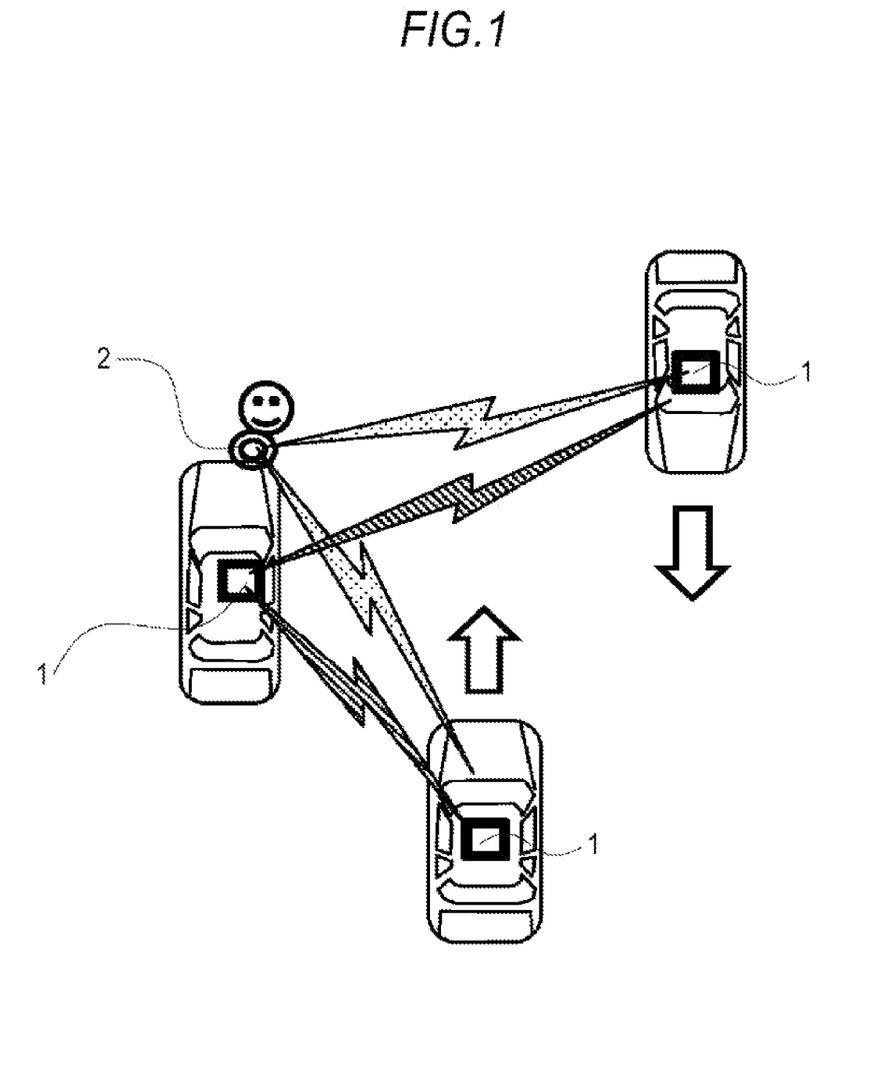
FIG. 1 is a schematic configuration diagram in which the relationship between a vehicle and a portable terminal device is assumed according to the present invention.
Figure 2:
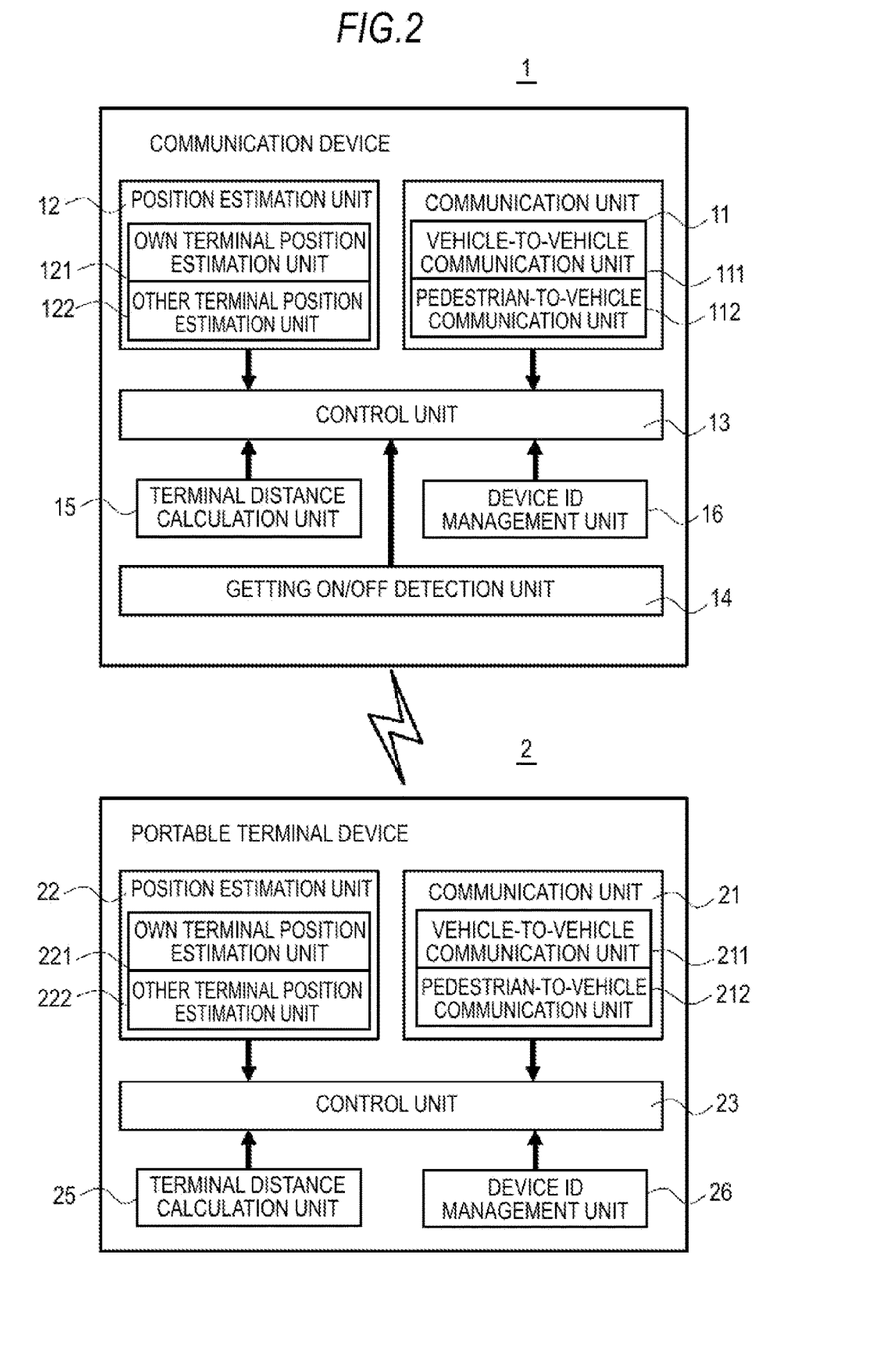
FIG. 2 is a configuration diagram showing a schematic configuration of a communication apparatus and a portable terminal device according to a first embodiment of the present invention.

An embodiment of a vehicle traveling support communication system according to the present invention will now be described in detail with reference to the drawings.
First Embodiment As shown in FIG. 1, the present invention includes two devices; a communication device 1 in a vehicle and a portable terminal device 2 carried by a driver. Further, these devices are illustrated as a functional block diagram of the communication device 1 and the portable terminal device 2 as shown in FIG. 2. The communication device 1 includes, as a vehicle-to-vehicle communication device, a communication unit 11, a position estimation unit 12, a control unit 13, a getting on/off detection unit 14, a terminal distance calculation unit 15 and a device ID management unit 16. Further, the portable terminal device 2 includes a communication unit 21, a position estimation unit 22, a control unit 23, a terminal distance calculation unit 25 and a device ID management unit 26.

The communication unit 11, 21 includes a vehicle-to-vehicle communication unit 111, 211 and a pedestrian-to-vehicle communication unit 112, 212, respectively, so as to realize communication between communication devices in vehicles or between a communication device in a vehicle and a portable terminal device. Terminal position information and a device ID obtained through communications are output to the control unit 13, 23.

The vehicle-to-vehicle communication unit 111, 211 realizes the communication between communication devices in vehicles. Note that any types of communication schemes may be used for the vehicle-to-vehicle communication unit 111, 211. An example of a communication scheme includes existing Wi-Fi, Bluetooth (registered trademark) and IEEE802.11p.

The pedestrian-to-vehicle communication unit 112, 212 realizes the communication between a communication device in a vehicle and a portable terminal device. Note that any types of communication schemes may be used for the pedestrian-to-vehicle communication unit 112, 212. An example of a communication scheme includes existing Wi-Fi, Bluetooth and IEEE802.11p. Further, the same communication scheme may be employed for the vehicle-to-vehicle communication unit 111, 211 and the pedestrian-to-vehicle communication unit 112, 212.

Note that although the vehicle-to-vehicle communication unit 111, 211 and the pedestrian-to-vehicle communication unit 112, 212 are separated from one another in this example, they may be integrated and the same communication scheme may be used for it. Information on a vehicle and a pedestrian may be obtained in the same communication scheme, for example, in the vehicle-to-vehicle communication and the pedestrian-to-vehicle communication in IEEE802.11p.

The position estimation unit 12, 22 includes an own terminal position estimation unit 121, 221 and another terminal position estimation unit 122, 222, respectively, and performs position estimation of surrounding terminals including the own terminal. The estimated position information is output to the control unit 13, 23.

The own terminal position estimation unit 121, 221 estimates the information on the current position of the own terminal. Note that no position estimation scheme of the own terminal position estimation unit 121, 211 is specified. An example of this may include a method of performing a map matching using GPS information and map data, which is employed in an existing car navigation.

The other terminal position estimation unit 122, 222 estimates the information on the current position of another terminal based on received data obtained from the communication unit 11, 12. Note that no position estimation scheme of the other terminal position estimation unit 122, 222 is specified. An example of this may include a method of using position information obtained as received data without modification, and a method of performing position estimation based on the amount of movement that is calculated using the history of position information.

The control unit 13, 23 controls the communication unit 11, 21, the position estimation unit 12, 22, the getting on/off detection unit 14, the terminal distance calculation unit 15, 25, and the device ID management unit 16, 26 to grasp a surrounding situation, determine whether to transmit the position information on the own terminal based on the surrounding situation, and realize data transmission and reception based on the determination result.

The getting on/off detection unit 14 detects that a driver gets on/off his/her vehicle. Although no algorithm for detection is specified, an example of this may include a method of detecting whether the driver gets on/off the vehicle by confirming the ignition ON/OFF of the vehicle, and the state of the opening and closing of the door based on in-vehicle information (vehicle information).

As a specific example of a detection method, for example, when through the vehicle information, the door is changed from the open state to the close state, and the ignition is changed from the OFF state to the ON state, it is detected that the driver gets on the vehicle. On the other hand, when through the vehicle information, the ignition is changed from the ON state to the OFF state, and the door is changed from the close state to the open state, it is detected that the driver gets off the vehicle.

The terminal distance calculation unit 15, 25 calculates the distance between the terminal devices based on the position information on the own terminal and the other terminal estimated by the position estimation unit 12, 22. The position information on the own terminal and the other terminal is input from the control unit 13, 23, and then the calculation result is output.

The device ID management unit 16, 26 manages device IDs for identifying respective terminals. The device IDs to be managed include the device ID for the other terminal which is previously registered by using a predetermined method, in addition to the device ID for the own terminal. The registration or reference of device IDs is carried out through the control unit 13, 23.

Note that any types of device ID registration methods may be used. An example of this may include a method in which the communication device 1 and the portable terminal device 2 which perform the vehicle-to-vehicle communication use a communication scheme having a terminal authentication, such as SSL used in the existing Internet to share their device IDs with each other.

Here, the operation flow in the invention will be described. Note that, in the following, as a representative example of this idea, in an environment where there are a plurality of communication devices 1 mounted on vehicles, and a plurality of portable terminal devices 2 carried by drivers as shown in FIG. 1, an exemplary operation between a predetermined communication device and a portable terminal device will be described.

Figure 3:
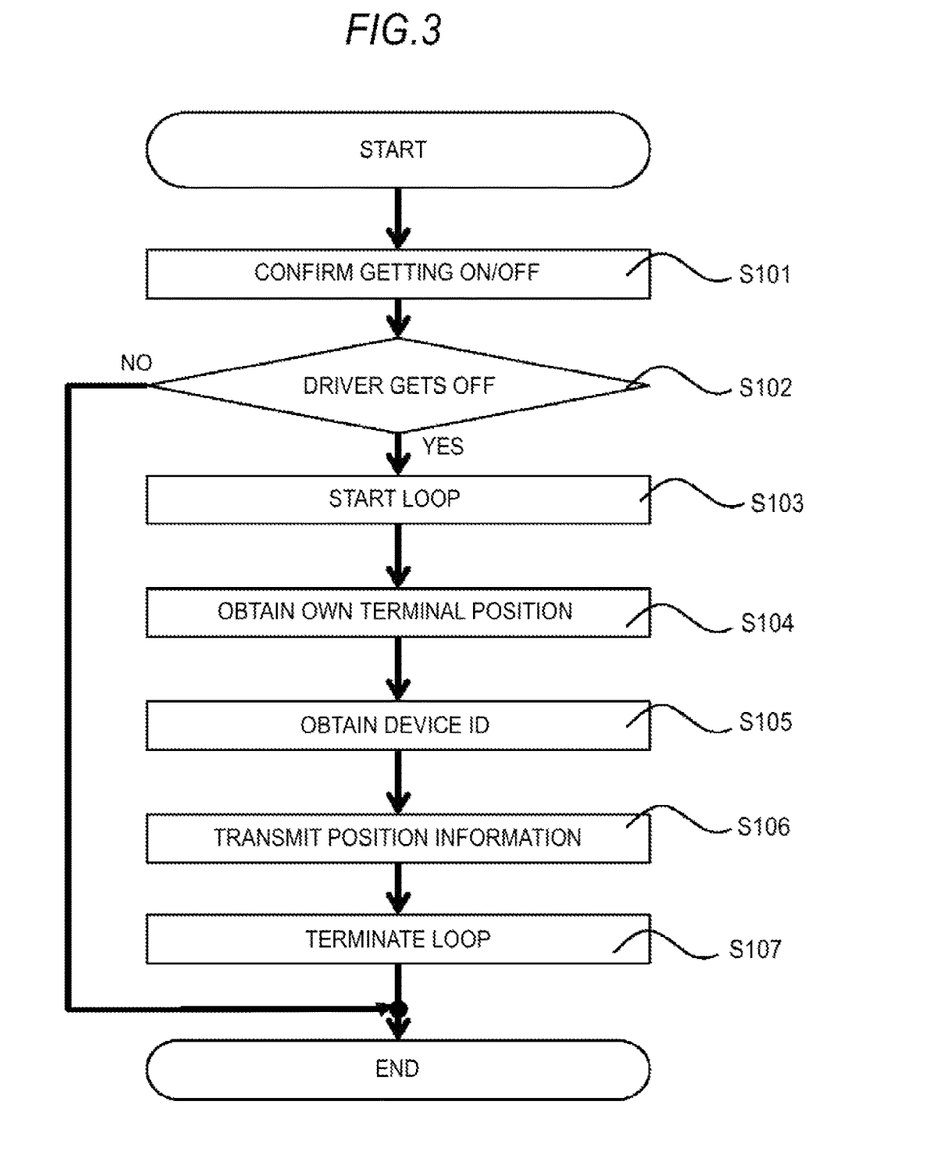
FIG. 3 is a diagram showing the operation flow of a vehicle traveling support communication system according to the first embodiment of the present invention.
Figure 4:
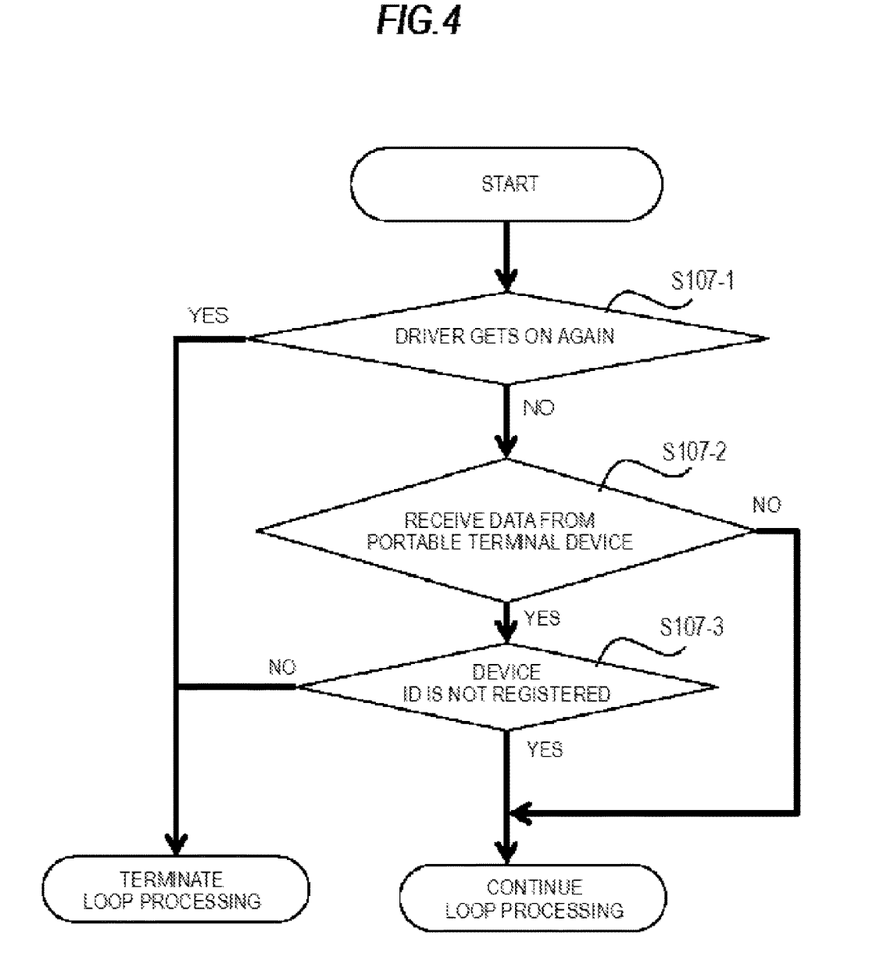
FIG. 4 is a diagram showing the operation flow of the processing termination determination of the vehicle traveling support communication system according to the first embodiment of the present invention.
Figure 5:
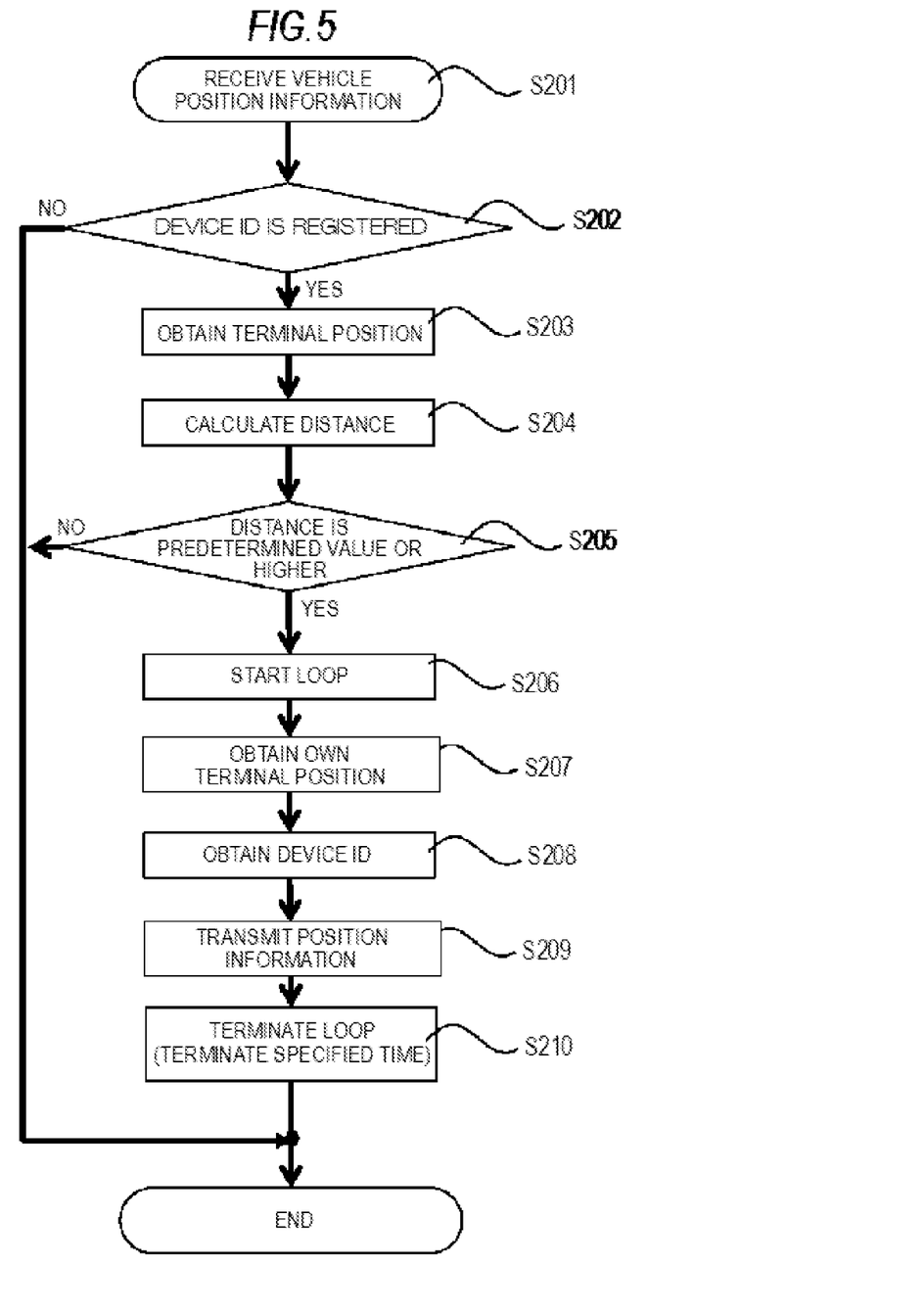
FIG. 5 is a diagram showing the operation flow of the portable terminal device according to the first embodiment of the present invention.

FIGS. 3 to 5 show the operation flows of the operation of the communication device 1 and the portable terminal device 2, respectively. Hereinafter, the way that, as shown in the flow of each diagram, each device operates and cooperates to function as a system will be described in turn based on each operation of each device.

First, according to the operation flow shown in FIG. 3, the getting on/off detection unit 14 of the communication device 1 confirms the state of the driver getting on/off the vehicle, and, when the getting on/off state is changed, outputs it to the control unit 13 (S101). When it is detected that the driver gets off the vehicle through the getting on/off detection unit 14 (S102: Yes), the control unit 13 starts loop processing described below (S104-S106) (S103). On the other hand, when it is not detected that the driver gets off the vehicle, (S102: No), this processing is terminated without doing anything. The position estimation unit 12 estimates the position information on the own terminal through the own terminal position estimation unit 121, and outputs it to the control unit 13 (S104).

The device ID management unit 16 outputs the device ID of the own terminal to the control unit 13 (S105). The communication unit 11 transmits the data including the own terminal position information and the device ID input from at least the control unit 13 to a surrounding communication terminal through the vehicle-to-vehicle communication unit 111 (S106).

According to the operation flow shown in FIG. 4, the control unit 13 performs loop termination determination processing described below (S107-1-S107-3) (S107). When it is determined to terminate the loop processing, this processing is also terminated in conjunction with the loop processing. When it is not determined to terminate the loop processing, the loop processing is continued.

The control unit 13 confirms whether the getting on/off state of the driver is changed through the getting on/off detection unit 14 (S107-1). When the state of the driver is not changed from the getting-off state to the getting-on state (getting on the vehicle again) (S107-1: No), the control unit 13 confirms the data received from the portable terminal device through the communication unit 11 (S107-2).

The control unit 13 confirms the received data when receiving the data from the portable terminal device through the communication unit 11 (S107-2: Yes). The control unit 13 confirms whether the device ID in the received data is registered with the device ID management unit 16 (S107-3). When the device ID in the received data is registered (S107-3: No), the loop processing is terminated. Note that, otherwise, the loop processing is continued.

Next, according to the operation flow shown in FIG. 5, when receiving the data which is transmitted from the communication device 1 through the vehicle-to-vehicle communication unit 211, the communication unit 21 of the portable terminal device 2 outputs the received data to the control unit 23 (S201).

Through the device ID management unit 26, the control unit 23 confirms whether the device ID in the data is registered (S202). When the device ID in the received data is already registered (S202: Yes), the following processing is performed; on the other hand, when the device ID is not registered (S202: No), this processing is terminated without performing the following processing.

The position estimation unit 22 performs position estimation of the own terminal and a surrounding terminal through the own terminal position estimation unit 221 and the other terminal position estimation unit 222 (S203). The received data which is input from the control unit 23 is used for the position estimation of the surrounding terminal. All the estimated position information is output to the control unit 23. The terminal distance calculation unit 25 performs the distance calculation of the own terminal and the surrounding terminal based on the position information on the own terminal and the surrounding terminal described above (S204). The position information on the own terminal and the surrounding terminal, is input from the control unit 23, and then the calculation result is output. It is confirmed whether the calculated distance information is a predetermined value or higher (S205).

When the calculated distance information is the predetermined value or higher (S205: Yes), the control unit 23 starts loop processing described below (S207-S210) (S206). On the other hand, when the calculated distance information is not the predetermined value or higher (S205: No), this processing is terminated without doing the following processing. The position estimation unit 22 estimates the position information on the own terminal through the own terminal position estimation unit 221, and outputs it to the control unit 23 (S207).

The device ID management unit 26 outputs the registered device ID of the own terminal to the control unit 23 (S208). The communication unit 21 transmits the data including the own terminal position information and the device ID input from at least the control unit 23 to a surrounding communication terminal through the vehicle-to-vehicle communication unit 211 (S209). The control unit 23 determines whether the loop processing is terminated (S210). Although no termination determination method is specified in detail, as an example, the processing is terminated when a predetermined time has elapsed since the loop processing was started, when the loop processing is carried out a predetermined number of times or the like. Note that it is described that the position estimation unit 22 of the portable terminal device 2 utilizes the received data input from the control unit 23 for position estimation; the received data is data transmitted from the communication device 1, and the position information held by the portable terminal device 2 is updated with the received data. In this manner, the data transmitted from the communication device 1 is used to update the position information, thereby, it is possible to shorten the time of information processing because there is no need to obtain additional GPS information.

As described above, according to the present invention, the communication device and the portable terminal device transmit position information through communication to notify a surrounding vehicle of the position of a driver in real time. Further, the communication device and the portable terminal device coordinate with each other to avoid simultaneous transmission of position information, thereby achieving reduction in the amount of communication information.

Furthermore, although there may be a problem of interference between a vehicle-to-vehicle communication and a pedestrian-to-vehicle communication in a case where the vehicle-to-vehicle communication and the pedestrian-to-vehicle communication are carried out in a same communication scheme or in a case where they are integrated, according to the present invention, the communication device and the portable terminal device coordinate with each other, thereby, it is possible to avoid communication interference.

Moreover, according to the present invention, the system starts the operation in accordance with the detection that the driver got off the vehicle, thereby, it is possible to avoid the constrain of communication information, which may be caused by transmitting unnecessary data before the driver gets off the vehicle (for example, during a temporary stop). In addition, according to the present invention, when the communication device and the portable terminal device coordinate with each other, the distance between the terminal devices is calculated and used, thereby, the communication device with superior communication range and power consumption can be used to the maximum when they coordinate with each other, thus, the power saving of the portable terminal device and the expansion of the communication area can be expected. Further, according to the present invention, each of the communication device and the portable terminal device has and manages its device ID, such that when the communication data including the device ID is transmitted, the transmission source may be identified, thereby, predetermined devices can cooperate with each other without being affected by an unrelated device even if a diffusion rate is high.

Note that, in the embodiment of the present invention, although a case where the driver gets off the vehicle is described, a person who gets off the own vehicle is not limited to the driver and another person may get off the vehicle; in a case where the other person gets off it, the other person may carry the portable terminal device like the driver as in the above case so as to transmit the position information, thereby, it is possible to obtain the same effect. Moreover, according to the present invention, the activated system terminates the operation in accordance with the detection that the driver gets on the vehicle, which prevents the continuance of the transmission of unnecessary data even if the driver gets on the vehicle again (for example, restroom breaks), thereby, it is possible to avoid the constrain of communication information.

Note that in the present invention, each embodiment may be changed and omitted as appropriate within the scope of the invention.

Various modifications and alterations of this invention will be apparent to those skilled in the art without departing from the scope and sprit of this invention, and it should be understood that this is not limited to the illustrative embodiments set forth herein.

What is claimed is:

1. A vehicle traveling support communication apparatus comprising:
   a communication unit for performing a vehicle-to-vehicle communication between a vehicle-mounted terminal device for an own vehicle and a vehicle-mounted terminal device for a surrounding vehicle, and a pedestrian-to-vehicle communication between the vehicle-mounted terminal device for the own vehicle and a portable terminal device;
   a position estimation unit for obtaining position information on the vehicle-mounted terminal device for the own vehicle;
   a getting on/off detection unit comprising a first sensor that detects the ignition state of the vehicle, and a second sensor that detects whether a vehicle door is opened or closed, for detecting that a person who has been riding in the vehicle gets off it; and
   a control unit for causing the communication unit to transmit the position information obtained by the position estimation unit to the surrounding vehicle when the getting on/off detection unit detects the person who got off the vehicle, and to terminate the transmission of the position information by the communication unit, upon receiving mobile position information from the portable terminal device carried by the person who got off the vehicle through the pedestrian-to-vehicle communication of the communication unit.

2. The vehicle traveling support communication apparatus according to claim 1, wherein the position estimation unit has a function of obtaining position information on the portable terminal device in addition to position information on the vehicle-mounted terminal device for the own vehicle, and the control unit controls to terminate the transmission of the position information on the vehicle-mounted terminal device for the own vehicle when a distance between the vehicle-mounted terminal device and the portable terminal device becomes more than or equal to a predetermined distance.

3. The vehicle traveling support communication apparatus according to claim 1, wherein when the getting on/off detection unit detects that the person who got off the vehicle gets on the own vehicle again within a predetermined time, the control unit causes the communication unit to terminate the transmission of the position information on the vehicle-mounted terminal device for the own vehicle through the vehicle-to-vehicle communication.

4. A vehicle traveling support communication system, comprising the communication apparatus according to claim 1 and a portable terminal device associated with the vehicle-mounted terminal device of the communication apparatus, wherein the control unit of the communication apparatus exercises control by identifying that information is from the previously registered portable terminal device.

5. A vehicle traveling support communication apparatus comprising: a communication unit for performing a vehicle-to-vehicle communication between a vehicle-mounted terminal device for an own vehicle and a vehicle-mounted terminal device for a surrounding vehicle, and a pedestrian-to-vehicle communication between the vehicle-mounted terminal device for the own vehicle and a portable terminal device; a position estimation unit for obtaining position information on the vehicle-mounted terminal device for the own vehicle; a getting on/off detection unit for detecting that a person who has been riding in the vehicle gets off it; and a control unit for causing the communication unit to transmit the position information obtained by the position estimation unit to the surrounding vehicle when the getting on/off detection unit detects the person who got off the vehicle, and to terminate the transmission of the position information by the communication unit, upon receiving mobile position information from the portable terminal device carried by the person who got off the vehicle through the pedestrian-to-vehicle communication of the communication unit;
   wherein the position estimation unit has a function of obtaining position information on the portable terminal device in addition to position information on the vehicle-mounted terminal device for the own vehicle, and the control unit controls to terminate the transmission of the position information on the vehicle-mounted terminal device for the own vehicle when a distance between the vehicle-mounted terminal device and the portable terminal device becomes more than or equal to a predetermined distance; and
   wherein the portable terminal device is previously registered with the vehicle-mounted terminal device, and when the getting on/off detection unit detects that the person who got off the vehicle gets on the own vehicle again within a predetermined time, the control unit exercises control by identifying that information is from the previously registered portable terminal device, and causes the communication unit to terminate the transmission of the position information on the vehicle-mounted terminal device for the own vehicle through the vehicle-to-vehicle communication.

6. A vehicle traveling support communication apparatus comprising: a communication unit for performing a vehicle-to-vehicle communication between a vehicle-mounted terminal device for an own vehicle and a vehicle-mounted terminal device for a surrounding vehicle, and a pedestrian-to-vehicle communication between the vehicle-mounted terminal device for the own vehicle and a portable terminal device; a position estimation unit for obtaining position information on the vehicle-mounted terminal device for the own vehicle; a getting on/off detection unit for detecting that a person who has been riding in the vehicle gets off it; and a control unit for causing the communication unit to transmit the position information obtained by the position estimation unit to the surrounding vehicle when the getting on/off detection unit detects the person who got off the vehicle, and to terminate the transmission of the position information by the communication unit, upon receiving mobile position information from the portable terminal device carried by the person who got off the vehicle through the pedestrian-to-vehicle communication of the communication unit;
   a portable terminal device associated with the vehicle-mounted terminal device of the communication apparatus, wherein the control unit of the communication apparatus exercises control by identifying that information is from the previously registered portable terminal device;
   wherein the portable terminal device includes a communication unit for performing a pedestrian-to-vehicle communication with the vehicle-mounted terminal device; a position estimation unit for obtaining position information on the portable terminal device; a terminal distance calculation unit for calculating a distance between the vehicle-mounted terminal device and the portable terminal device based on the position information on the vehicle-mounted terminal device and the position information on the portable terminal device; and a control unit for controlling the communication unit based on the distance between the vehicle-mounted terminal device and the portable terminal device, wherein the transmission of the position information on the portable terminal device is started when the distance between the vehicle-mounted terminal device and the portable terminal device becomes more than or equal to a predetermined distance.

7. The vehicle traveling support communication system according to claim 6, wherein the vehicle-mounted terminal device obtains the position information transmitted from the communication unit when detecting a person who got off the vehicle to update the position information on the portable terminal device.

\* \* \* \* \*